United States Patent [19]

Cronson et al.

[11] 3,903,477

[45] Sept. 2, 1975

[54] NETWORK TIME DOMAIN MEASUREMENT SYSTEM

[75] Inventors: Harry M. Cronson, Lexington; Peter G. Mitchell, Concord, both of Mass.

[73] Assignee: Sperry Rand Corporation, New York, N.Y.

[22] Filed: July 29, 1974

[21] Appl. No.: 492,553

[52] U.S. Cl. .......................................... 324/58.5 A
[51] Int. Cl.² ........................................ G01R 27/04
[58] Field of Search ..... 324/58.5 A, 58.5 B, 58.5 R, 324/58 A

[56] References Cited
UNITED STATES PATENTS
3,812,423   5/1974   Cronson et al. ............... 324/58.5 A Primary Examiner—Stanley T. Krawczewicz
Attorney, Agent, or Firm—Howard P. Terry

[57] ABSTRACT

The forward and backward scattered energy of a high frequency network or composition of matter exposed to a composite electromagnetic energy wave is sampled by a compensated sampling system and the incident wave and reflected and transmitted response waves are employed in performing discrete Fourier transformations in a computation process yielding the complex electrical characteristics of the network or composition of matter.

7 Claims, 3 Drawing Figures

NETWORK TIME DOMAIN MEASUREMENT SYSTEM

BACKGROUND OF THE INVENTION

1. Field of the Invention

The invention pertains to apparatus for measuring the complex high frequency electrical characteristics of networks or of compositions of matter and more specifically concerns time domain apparatus for the accurate and rapid measurement of the electrical high frequency complex characteristics of networks or compositions of matter contemplated for use in high frequency electrical apparatus.

2. Description of the Prior Art

In the past, measurements of the complex characteristics of high frequency networks have been made at fixed frequencies using relatively narrow band slotted line or impedance bridge systems of the high frequency type. Many time consuming measurements were required with such prior art apparatus in order to span even a relatively narrow frequency range. Although recently, computer-controlled, swept frequency network analyzer measurements have made great improvements in speed and accuracy over single frequency techniques, these systems are expensive. With a time domain system employing the simple inexpensive generator described herein, the measurements can be made with similar speed and accuracy at less cost. Such greatly improved methods utilize and measure the scattering responses of networks or high frequency materials to incident base band impulses in the time domain, rather than in the frequency domain. The new methods permit simultaneous display on a sampling oscilloscope of a wave form with representations of the incident base band impulse and its backward and forward scattered time-domain signatures, the latter being uniquely related to the intrinsic properties of the network or material under examination. However, though such systems often permit rapid and accurate measurement of network characteristics, they do not under all circumstances provide full satisfaction where measurements over a very wide range of frequencies is desired. While intrinsically capable of operation over an approximate frequency range of 0.1 to 18 GHz., accurate time domain measurements have thus far been made only up to about 10 GHz. While commercially available sampling oscilloscopes yield good results up to 18 GHz., base band impulse generators available are characterized by a spectrum of rapidly falling amplitude at very high frequencies. This factor, along with the peak voltage breakdown limitation of available sampling diodes, has resulted in operation with relatively poor signal-to-noise ratios for the high frequency portion of the spectrum, it not being possible to improve signal-to-noise ratio simply by increasing the amplitude of the input base band impulses. In general, the prior art base band measurement systems have provided excellent data in the frequency region below 8 GHz., but data generated for frequencies much higher than 10 GHz. often lacks a desired degree of accuracy.

SUMMARY OF THE INVENTION

The present invention is a high frequency or microwave system permitting the rapid and accurate measurement of the complex scattering characteristics of transmission line networks or compositions of matter when subjected to an incident composite wave of electromagnetic energy. The invention employs a transmission line configuration that permits insertion of the network or composition sample therein and display on a sampling oscilloscope of wave form representations of the incident composite wave and its forward and backward scattered time domain signatures, the latter being directly related to the characteristics of the network or material under test. The sample under test does not necessarily need to be removed from the test system and elements having substantial insertion loss may be investigated.

DESCRIPTION OF THE PREFERRED EMBODIMENTS

According to the present invention, apparatus is provided for the accurate and rapid measurement of the complex characteristics of electrical elements at high or microwave frequencies by observation of the forward and backward scattering responses of such elements to a composite electromagnetic wave form through the use of time-to-frequency domain processing techniques. In general, the measurement apparatus consists of an arrangement for exciting the network or material sample or element to be investigated in a transmission line system with a composite wave of high frequency energy. The incident composite wave is itself processed by and may be displayed by a high frequency sampling oscilloscope system, and the time-stretched wave form is then made available by the oscilloscope or other sample and hold device to be converted into a digital representation. The latter is automatically read into a suitably programmed general purpose electronic digital computer, whee the sampled wave form is converted into its Fourier transform to yield the complex spectrum of the incident impulse.

In a similar manner, the transient electrical wave forms transmitted through and back scattered from the sample under investigation are then also successively processed and may be displayed by the sampling oscilloscope, are converted into digital data, and are finally subjected to Fourier transformation in the digital computer. With appropriate adjustments to ensure that the time domain reference is the same for each of the successive measurements, ratios of the reflected wave spectrum to the incident wave spectrum and of the transmitted wave spectrum to the incident wave spectrum are developed. As may be readily demonstrated, these ratio values are manipulated so as to yield the respective reflection and transmission scattering coefficients of the network or composition under study in a manner generally similar to that employed in the G. F. Ross et al U.S. Pat. No. 3,693,080, issued Sept. 19, 1972 for "Time Domain Measurement of High Frequency Complex Permittivity and Permeability of Transmission Line Enclosed Material Sample" and assigned to the Sperry Rand Corporation. The Ross et al concepts and also the concepts disclosed in the Cronson et al U.S. Pat. No. 3,812,423, issued May 21, 1974 for "Network Time Domain Measurement System" and assigned to the Sperry Rand Corporation, may be employed in the present invention.

Figure 1:
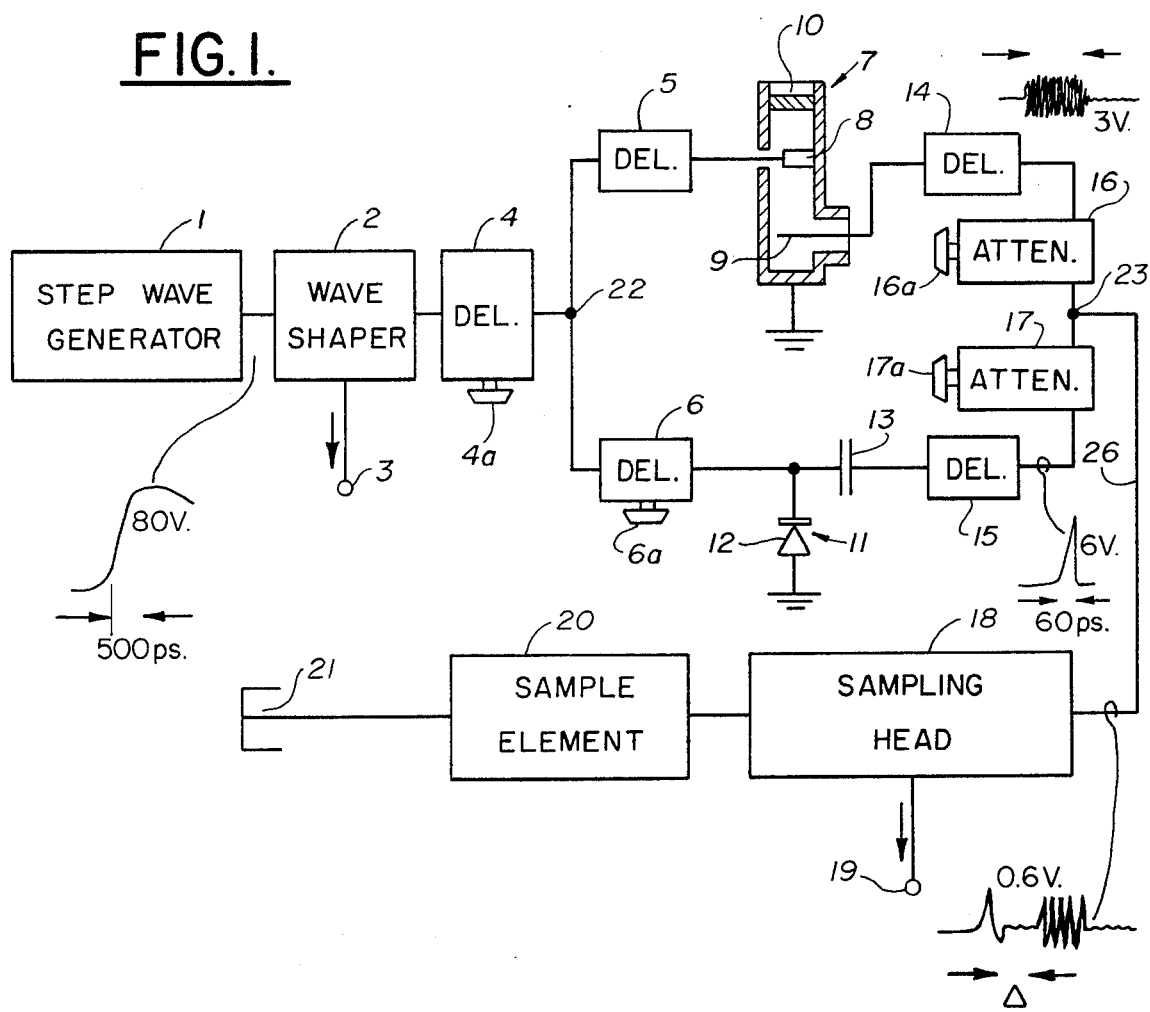
FIG. 1 is a diagram of the preferred form of the invention showing electrical components and their interconnections.

Referring to FIG. 1, the step wave generator 1 produces a relatively steep fronted wave of, for example, 80 volts amplitude with the wave front increasing to its maximum value in about 500 picoseconds. A conventional step voltage generator circuit may be employed for this purpose of the general type, for example, in which a section of delay line and an avalanche transistor of the 2N2896 type cooperate. Other conventional step forming networks may alternatively be employed. The output of step wave generator 1 is then sharpened by a conventional wave shaping circuit 2 so that the rise time of the input pulse is diminished, for example, to 200 picoseconds for a 60 volt output stepped wave. Wave shaper 2 is a conventional circuit employing a step-recovery diode of the Hewlett-Packard 5082-0365 kind also designed to provide a relatively steep fronted trigger wave at terminal 3 for synchronization of apparatus of FIG. 3 yet to be described. The sharpened step wave from wave shaper 2 is next applied to delay element 4, which may be adjustable as indicated at 4a and which is capable of providing a total 70 nanosecond delay.

Accordingly, the output of delay element 4 has been sharpened with respect to the step wave form produced by generator 1 and is delayed with respect to the trigger pulse found on terminal 3. The output of delay 4 is substantially equally split by the conventional tee junction 22 for delivery to delay elements 5 and 6 residing in separate circuit branches. These circuit branches are coupled together again at the conventional tee junction 23 for provision of an output on a single transmission line 26. It will be understood that the several transmission lines shown in the drawing each by a single line may in fact comprise conventional transmission lines, such as coaxial or shielded transmission lines. It will be further understood that the characteristic delays of the several delay elements appearing in the system, including delays 4, 5, 6, 14, and 15 will have particular values such as to serve to keep unwanted signals out of the time window of sampling oscilloscope 38 (FIG. 3) and to ensure that the composite transmitted and reflected wave forms actually arrive within the selected time window using techniques described in the aforementioned patents.

Referring particularly to the branch line in which delay element 5 is found, the output of delay element 5 is connected to a diode 8 residing within a resonant section of hollow wave guide 7 provided with a tuning element 10 at one end and a pick up probe 9 opposite the latter. When the resonant element 7 and particularly diode 8 is excited by the step pulse, a train of radio frequency harmonic oscillations is generated within resonator 7 for coupling probe 9 and delivery to delay element 14. Before coupling to the tee element 23, the output of delay 14 may be attenuated by the adjustable attenuator 16.

With respect to the second branch of the tee junction 22, its output is delivered to delay element 6 and thence to a conventional sharpening and differentiating circuit 11 consisting of a conventional diode 12 connected to ground and a series connected capacitor 13. This conventional circuit operates further to sharpen the output of delay element 6 and to differentiate its leading edge so as to produce, after passing through delay element 15, a substantially symmetric 6 volt pulse of 60 picosecond duration, for example. The latter is applied through the adjustable attenuator 17 to the tee junction 23. The adjustments 16a and 17a of the two attenuators are provided so that the pulse and radio frequency cycles may be adjusted to have substantially equal amplitude in the third or output port 26 of tee junction 23. The adjustable delay 6 provides ready means for adjusting the delay Δ between the impulse and the start of the radio frequency cycles. The time Δ between the impulse and radio frequency cycles is normally adjusted to about a half of a nanosecond. Several considerations dictate the selected value of Δ; first, the two waves should be as close together as possible so that their total duration is as small as possible. In practice, their total duration is of the order of one nanosecond. Secondly, the value of Δ significantly influences the quality of the resultant spectrum in the range between 8 GHz. to 10 GHz. because of interference effects. Adjustments are readily made experimentally so as to obtain the largest amplitude spectrum in the greatest number of elements of this spectrum. Any one of the delay elements 5, 6, 14, or 15 may be adjusted for the purpose.

The composite wave on transmission line 26 is applied through the conventional sampling head 18 to a sample 20 to be tested. Sampling head 18 provides a useful output on terminal 19 for application in the sampling oscilloscope system of FIG. 3, as will be discussed. The composite wave incident on the sampling head 18 is passed through the sample element 20 to be reflected by a conventional short circuit 21. Thus, the composite wave may again pass through sample 20 into the sampling head 18 to provide on terminal 19 a second composite wave for measurement purposes within the sampling oscilloscope.

Figure 2:
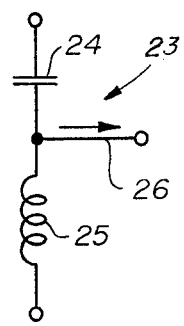
FIG. 2 is a drawing of a circuit which may be used in the apparatus of FIG. 1.

It will be understood that the invention may be practiced using signals of duration or voltage other than those cited in the foregoing and that these examples have been given merely to present an illustration of a typical configuration and its operation. Further, certain elements in the illustration of FIG. 1 may be replaced by other elements, including the conventional tee junction 23, for which may be substituted the triple-port network of FIG. 2. For example, tee junction 23 may couple the radio frequency wave form through a capacitor 24 and the base band impulse through an inductor 25, the output terminal 26 being connected between elements 24 and 25. The capacitor 24 serves approximately as a series short circuit for the radio frequency signal and as a series open circuit for the impulse. Further, the inductance 25 serves approximately as a series short for the impulse and as a series open circuit for the radio frequency wave.

The waves passed by sampling head 18 to terminal 19 have the same general characteristics as those sampled by the corresponding sampling head of the aforementioned U.S. Pat. No. 3,693,080 and they may therefore be processed in a generally similar manner. The foregoing consideration will be apparent from an understanding of FIG. 3, wherein terminal 19 represents the sampling head data input connection to the conventional externally synchronized sampling oscilloscope 38, which may be supplied with a cathode ray tube indicator 38a, and which may be synchronized by pulses from wave shaper 1 when applied to terminal 3. The sampled output from oscilloscope 38 is then supplied through a conventional amplifier 27, if amplification and filtering are desired, to a conventional digital voltmeter or analog-to-digital converter 29, wherein the analog signals supplied by oscilloscope 38 are converted to digital representations of the kind required for manipulation within the conventional general purpose digital computer 30. Oscilloscope 38 may be internally controlled or computer 30 may be used in a conventional manner to control the reading out of digital voltmeter 29 and likewise to synchronize the timing and operation of sampling oscilloscope 38 in a conventional manner. For the latter purpose, main sweep signals for use in oscilloscope 38 may be generated by computer 30 and supplied through digital-to-analog converter 32 to the sweep circuits of oscilloscope 38. Likewise, sweep jitter compensation signals may originate in the general purpose computer 30. These are processes by digital-to-analog converter 33, after which they are added to the main sweep signals in the conventional summing circuit 34 for application within sampling oscilloscope 38. For the purpose of simultaneous reduction of additive voltage drift and timing shifts, oscilloscope 38 may employ a triple-point scanning mode of operation. Instead of a common saw tooth wave sweep, the $x$ coordinate deflection of the cathode ray beam of sampling oscilloscope 38 may be driven in discrete steps to form a stair case wave by general purpose digital computer 30.

Figure 3:
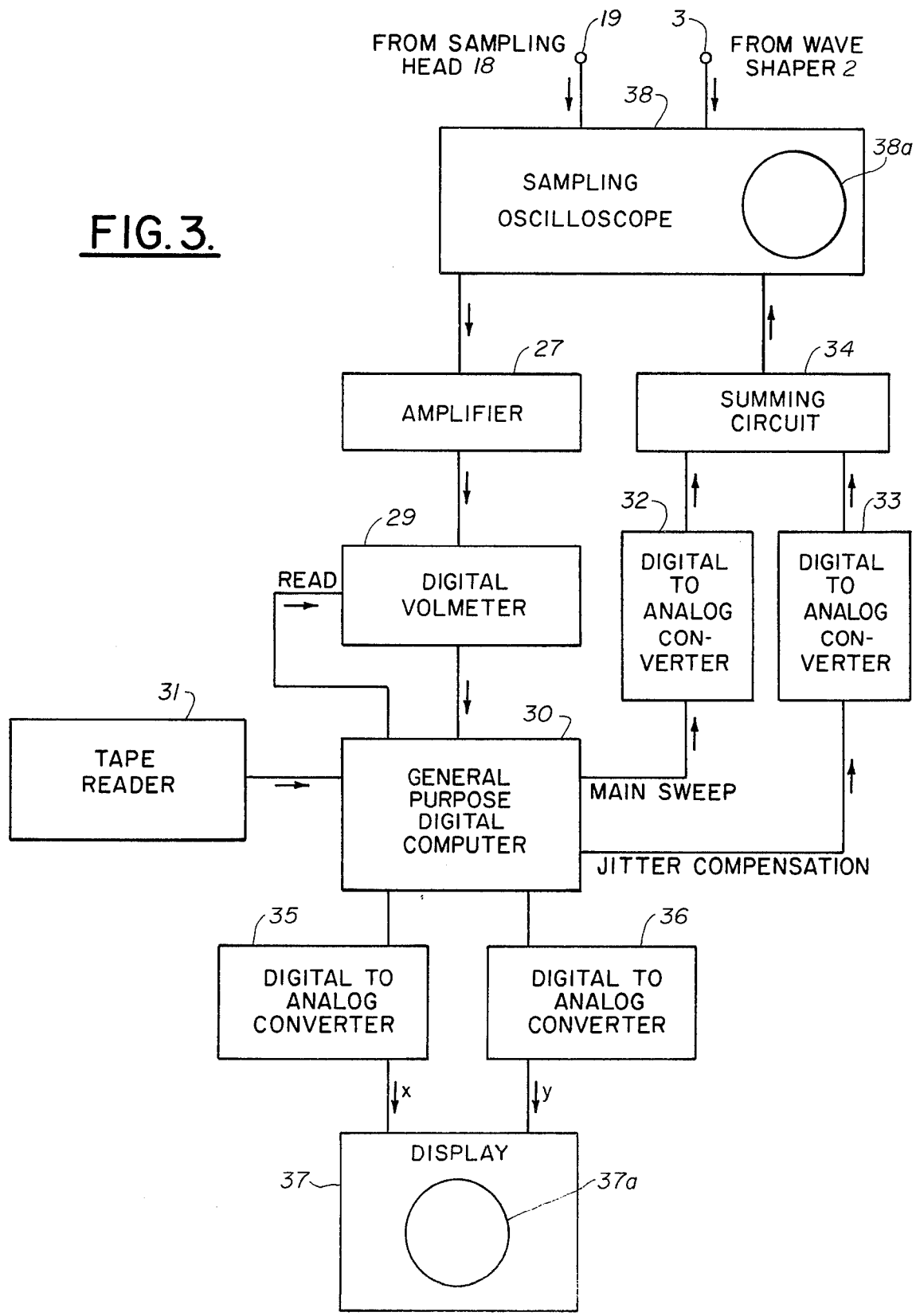
FIG. 3 is a block diagram of apparatus used in connection with that of FIG. 1.

Operation of computer 30 may be controlled by a program stored within an interior memory system or, as shown in FIG. 3, the operating program may be punched or otherwise applied to tape for processing by a conventional tape reader 31 and thereby supplied to computer 30. The program, as noted before, may be designed to determine, in a conventional manner, the internal operation of computer 30, as well as the operation of oscilloscope 38 and other ancillary equipment. Output signals derived by computer 30 are converted to analog voltages by digital-to-analog converters 35 and 36 for supply to the respective $x$ and $y$ deflection plates of cathode ray indicator tube 37a of display 37.

Sampling oscilloscope 38 may be a conventional apparatus wherein a sampling gate is adapted to be scanned continuously across successive repetitions of a repetitive wave form and is then returned to an initial position for recycling. Such sampling oscilloscopes have been employed in the past in the study of the impulse properties of high frequency circuits and have proven to be a valuable tool in these investigations. In using such devices, the effects of short term random fluctuations of the amplitude and timing of the wave forms passed through the high frequency circuit or material sample under study are successfully reduced by making repeated scans of the wave form, thereby averaging the random fluctuation signals to zero. However, there may be present long term amplitude drifts of the type found where high gain, wide band amplification circuits are required for proper application of the sampling system. Such long term amplitude and timing drifts are preferably eliminated in the present apparatus by employing an advanced type of sampling oscilloscope system providing means for compensating for long term amplitude and time drifts. A preferred sampling oscilloscope system is the subject of the A. M. Nicolson U.S. Pat. No. 3,584,309 for a "Method and Means for Compensating Amplitude and Time Drifts in Sampling Waveform Systems," issued June 8, 1971 and assigned to the Sperry Rand Corporation. In general, the apparatus of FIG. 3 may be operated in substantially the same manner as the computers of the aforementioned patents.

Accordingly, the present invention provides means for overcoming problems associated with prior art base band metrology systems and extends measurement capabilities to frequencies well beyond those achieved with consistent accuracy using prior art methods.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. Apparatus for measuring the high frequency electrical characteristics of a high frequency transmission line element under test by propagation of forward and backward scattered high frequency signals therethrough comprising:

step wave generator means, delay means responsive to said step wave generator means for producing a delayed step wave, first and second branching circuit means jointly responsive to said delay means, said first branching circuit means including harmonic wave generator means responsive to said delayed step wave, said second branching circuit means including differentiator circuit means responsive to said delayed step wave for producing a base band impulse signal, junction means coupling said first and second branching circuit means for forming a composite test signal, signal sampling means coupled between said junction means and said high frequency transmission line element when present for conducting said composite test signal through said high frequency transmission line element as a forward scattered high frequency signal, reflector means for reflecting said forward scattered high frequency signal through said transmission line element as a backward scattered high frequency signal, wave sample - and - hold means responsive to said signal sampling means for holding representations of said composite test signal, said forward scattered signal, and said backward scattered signal, general purpose computing means responsive to said wave sample - and - hold means adapted to be programmed to compute said high frequency electrical characteristics in response to said held wave representations, and display means responsive to said computing means for displaying said high frequency characteristics when computed.

2. Apparatus as described in claim 1 wherein at least one of said first and second branching circuit means includes adjustable delay means.

3. Apparatus as described in claim 2 wherein at least one of said first and second branching circuit means includes attenuator means.

4. Apparatus as described in claim 1 wherein said sample - and - hold means is additionally responsive to said step wave generator means.

5. Apparatus as described in claim 1 wherein said harmonic wave generator means comprises harmonic generator diode means disposed within cavity resonator means.

6. Apparatus as described in claim 4 wherein said differentiator circuit means comprises capacitor means coupled in series between said delay means and said junction means and diode means coupled between said delay means and ground.

7. Apparatus as described in claim 4 wherein said general purpose computing means is adapted to be programmed for:
digitizing said held wave representations of said composite test signal, of said forward scattered signal, and of said backward scattered signal,
performing discrete Fourier transformations on said representations, and
computing from said Fourier transformations the respective high frequency electrical characteristics of said high frequency transmission line element.

* * * * *